United States Patent
Loughrey et al.

(10) Patent No.: US 10,698,654 B2
(45) Date of Patent: Jun. 30, 2020

(54) RANKING AND BOOSTING RELEVANT DISTRIBUTABLE DIGITAL ASSISTANT OPERATIONS

(71) Applicant: AIQUDO, INC., San Jose, CA (US)

(72) Inventors: Conal Loughrey, Portstewart (GB); Hudson Leonardo Mendes, Belfast (GB)

(73) Assignee: AIQUDO, INC., Campbell, CA (US)

( * ) Notice: Subject to any disclaimer, the term of this patent is extended or adjusted under 35 U.S.C. 154(b) by 179 days.

(21) Appl. No.: 16/047,782

(22) Filed: Jul. 27, 2018

(65) Prior Publication Data

US 2018/0373494 A1  Dec. 27, 2018

Related U.S. Application Data

(63) Continuation-in-part of application No. 15/984,122, filed on May 18, 2018.
(Continued)

(51) Int. Cl.
 *G06F 3/16* (2006.01)
 *G10L 15/19* (2013.01)
(Continued)

(52) U.S. Cl.
 CPC .......... *G06F 3/167* (2013.01); *G06F 9/5055* (2013.01); *G06F 9/54* (2013.01);
(Continued)

(58) Field of Classification Search
 CPC .............. G06F 3/167; G06F 16/90332; G06F 16/90335; G06F 9/54; G06F 9/5055;
(Continued)

(56) References Cited

U.S. PATENT DOCUMENTS

| | | | |
|---|---|---|---|
| 8,843,466 B1 * | 9/2014 | Zeiger | G06F 16/951 707/706 |
| 9,123,336 B1 * | 9/2015 | Uszkoreit | G06F 40/226 |

(Continued)

OTHER PUBLICATIONS

International Search Report and Written Opinion dated Nov. 6, 2018 in International Patent Application No. PCT/US18/48063, 7 pages.

*Primary Examiner* — Matthew Ell
(74) *Attorney, Agent, or Firm* — Shook, Hardy & Bacon L.L.P.

(57) ABSTRACT

Embodiments described herein are generally directed towards systems and methods relating to a crowd-sourced digital assistant system and related methods. In particular, embodiments describe techniques for effectively searching, modifying, and selecting action datasets for distribution to digital assistant devices based on commands received therefrom. Action datasets include computing events or tasks that can be reproduced when a command is received by a digital assistant device and communicated to the server device. The digital assistant server described herein can receive action datasets, maintain action datasets, receive commands from digital assistant devices, and effectively select most relevant action datasets for distribution to the digital assistant devices based on the received commands.

17 Claims, 5 Drawing Sheets

Related U.S. Application Data

(60) Provisional application No. 62/508,181, filed on May 18, 2017, provisional application No. 62/580,444, filed on Nov. 1, 2017, provisional application No. 62/576,800, filed on Oct. 25, 2017.

(51) Int. Cl.

| | | |
|---|---|---|
| *G10L 15/22* | (2006.01) | |
| *G06F 9/54* | (2006.01) | |
| *G06F 9/50* | (2006.01) | |
| *G06F 16/9032* | (2019.01) | |
| *G06F 16/903* | (2019.01) | |

(52) U.S. Cl.
CPC .. *G06F 16/90332* (2019.01); *G06F 16/90335* (2019.01); *G10L 15/19* (2013.01); *G10L 15/22* (2013.01); *G10L 2015/221* (2013.01); *G10L 2015/223* (2013.01); *G10L 2015/225* (2013.01); *G10L 2015/228* (2013.01)

(58) Field of Classification Search
CPC ... G10L 15/19; G10L 15/22; G10L 2015/228; G10L 2015/223; G10L 2015/221; G10L 2015/225
See application file for complete search history.

(56) References Cited

U.S. PATENT DOCUMENTS

| | | | |
|---|---|---|---|
| 2003/0069880 A1* | 4/2003 | Harrison | G06F 16/3334 |
| 2011/0144996 A1* | 6/2011 | Ma | G06F 16/332 |
| | | | 704/251 |
| 2015/0120723 A1* | 4/2015 | Deshmukh | G06F 16/9535 |
| | | | 707/734 |
| 2015/0339754 A1 | 11/2015 | Bloem et al. | |
| 2015/0348551 A1 | 12/2015 | Gruber et al. | |
| 2016/0225371 A1* | 8/2016 | Agrawal | G06F 3/04842 |
| 2016/0358603 A1* | 12/2016 | Azam | G10L 15/22 |

* cited by examiner

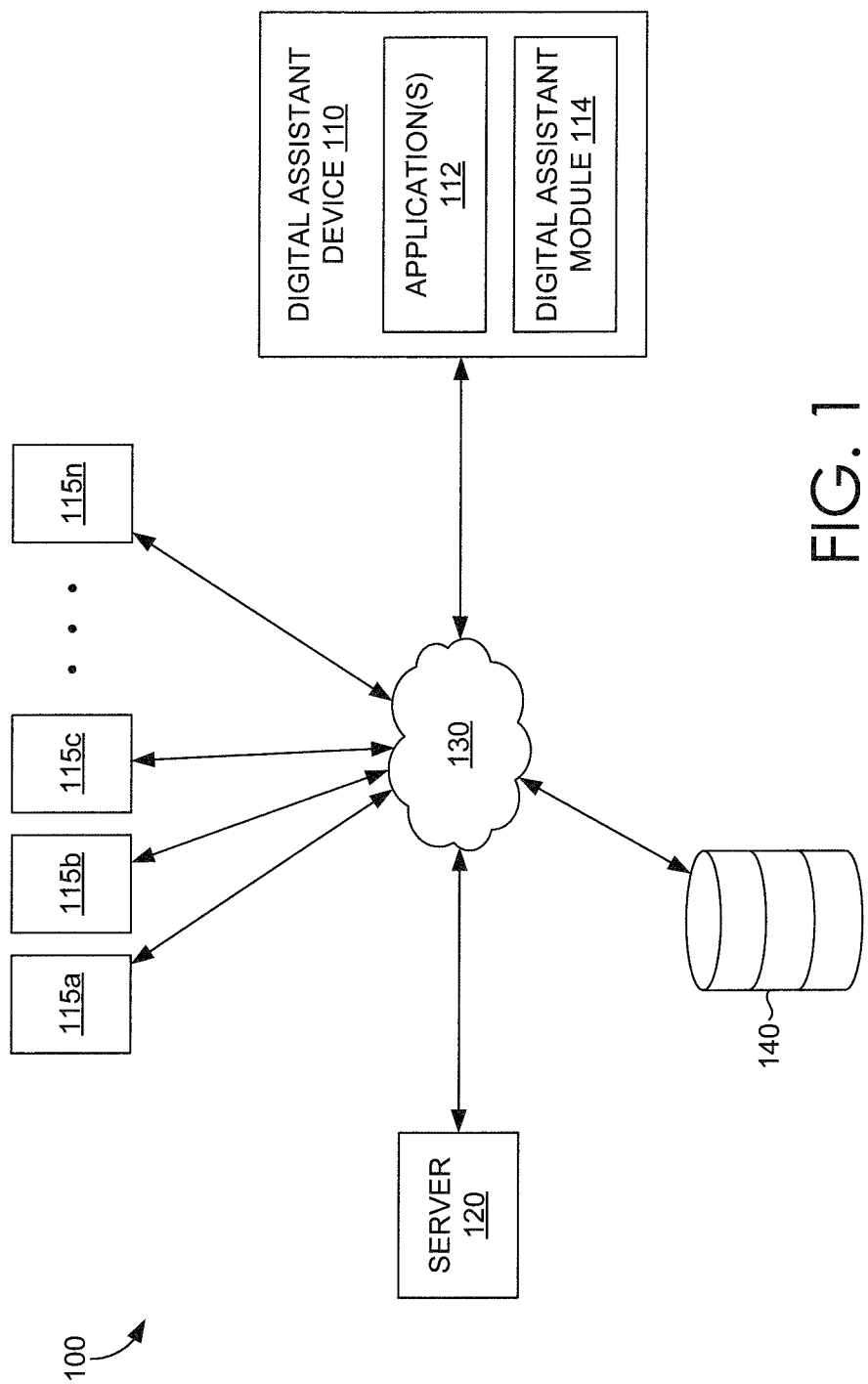

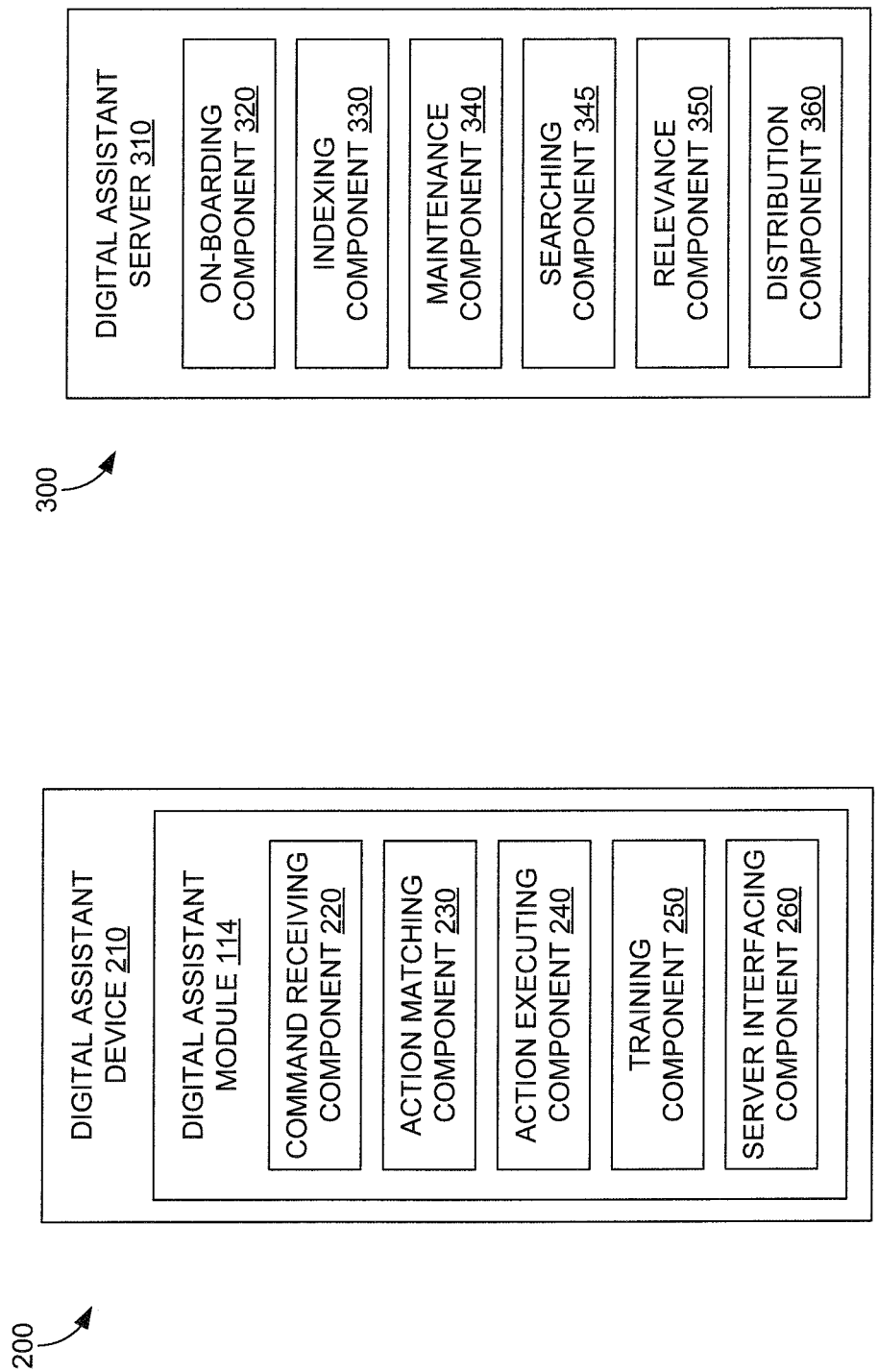

RANKING AND BOOSTING RELEVANT DISTRIBUTABLE DIGITAL ASSISTANT OPERATIONS

CROSS-REFERENCE TO RELATED APPLICATIONS

This application is a continuation-in-part of U.S. patent application Ser. No. 15/984,122, filed May 18, 2018, entitled CROWDSOURCED ON-BOARDING OF DIGITAL ASSISTANT OPERATIONS, which claims the benefit of U.S. Provisional Patent Application No. 62/508,181, filed May 18, 2017, entitled SYSTEM AND METHOD FOR CROWDSOURCED ACTIONS AND COMMANDS. This application is also related by subject matter and claims priority to U.S. Provisional Patent Application No. 62/576,800, filed Oct. 25, 2017, entitled A CROWDSOURCED DIGITAL ASSISTANT SERVER AND METHODS, and also to U.S. Provisional Patent Application No. 62/580,444, filed Nov. 1, 2017, entitled AUTOMATED METHOD TO CREATE DISCOURSES FROM USER COMMANDS, each of which are assigned or under obligation of assignment to the same entity as this application, the entire contents of each being herein incorporated by reference.

BACKGROUND

Digital assistants have become ubiquitously integrated into a variety of consumer electronic devices. Modern day digital assistants employ speech recognition technologies to provide a conversational interface between users and electronic devices. These digital assistants can employ various algorithms, such as natural language processing, to improve interpretations of commands received from a user. Consumers have expressed various frustrations with conventional digital assistants due to privacy concerns, constant misinterpretations of spoken commands, unavailability of services due to weak signals or a lack of signal, and the general requirement that the consumer must structure their spoken command in a dialect that is uncomfortable for them.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The described embodiments describe a digital assistant system including devices that facilitate the development of a crowd-sourced digital assistant. Users of the digital assistant system can easily contribute to the development of a language model and reproducible digital assistant operations, by easily recording desired operations and related commands on their respective digital assistant devices. Moreover, the users can benefit from the contribution of any other digital assistant device participating on the network of the digital assistant system, seamlessly, by speaking a command to their digital assistant device, which can then identify a corresponding previously-recorded operation to reproduce. Additional detail on such a digital assistant system can be found in U.S. patent application Ser. Nos. 15/935,983, 15/984,122, 15/988,620, 15/936,013, and 16/038,993, each of which is herein incorporated by reference by the entirety. By way of background, a digital assistant system described in accordance with the present disclosure can employ crowd-sourced digital assistant commands and actions that can be distributed to one or more digital assistant devices. Crowd-sourced data can include, among other things, action datasets that include or correspond to reproducible computing events and associated commands that can be employed to invoke a reproduction of computing events on computing devices having the crowd-sourced digital assistant installed and/or executing thereon. Crowd-sourced data can also include command templates, or groups thereof, which can include keywords, phrases, parameter fields, and other related information or metadata, any of which can be employed by a digital assistant device or a server for comparison to a received command to select one or more relevant action datasets.

Embodiments described in the present disclosure are generally directed towards techniques for effectively selecting relevant action datasets for communication to a digital assistant device based on a command received from the digital assistant device. In other words, based on a command communicated from a digital assistant device to a digital assistant server, one or more determined most-relevant action datasets or portions thereof can be identified, selected, and communicated to the digital assistant device so that an "action" (e.g., a set of operations or events) can be reproduced by the digital assistant.

BRIEF DESCRIPTION OF THE DRAWINGS

The present invention is described in detail below with reference to the attached drawing figures, wherein:

FIG. 1 is a block diagram of an exemplary computing environment for a crowd-sourced digital assistant system, in accordance with embodiments of the present invention;

FIG. 2 is a block diagram of an exemplary digital assistant device, in accordance with an embodiment of the present disclosure;

FIG. 3 is a block diagram of an exemplary digital assistant server, in accordance with an embodiment of the present disclosure;

DETAILED DESCRIPTION

Figure 4:
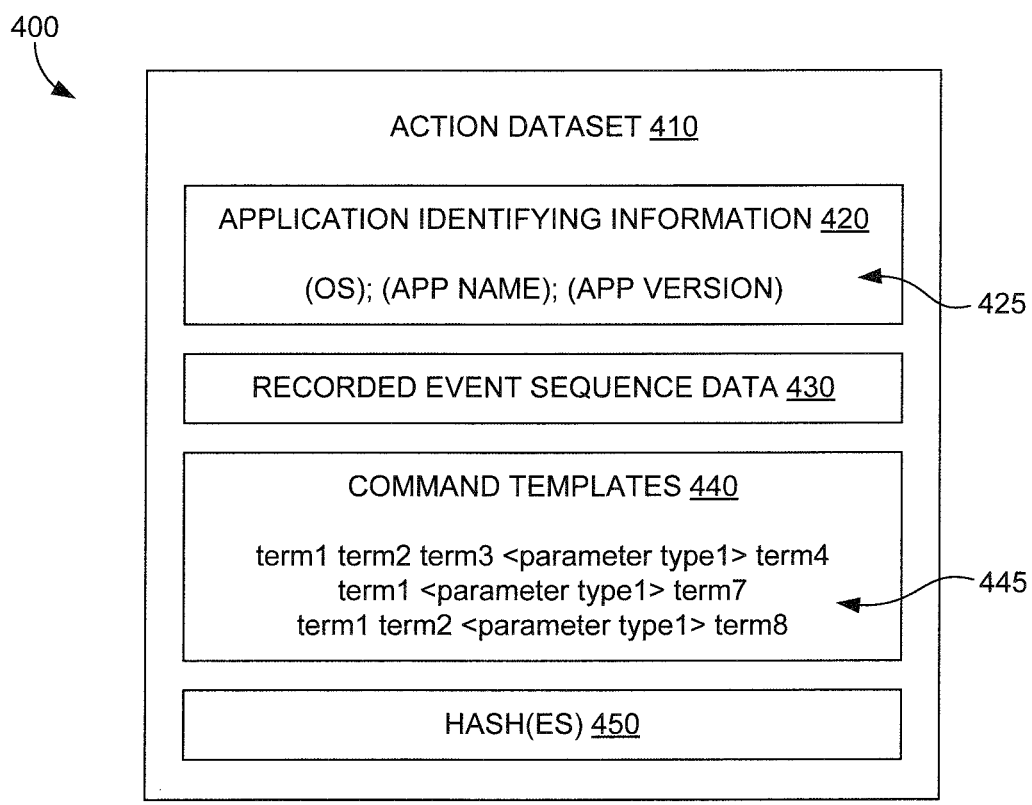
FIG. 4 is an exemplary data structure of an action dataset, in accordance with an embodiment of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein are generally directed towards systems and methods for effectively interpreting the intent of received commands, by way of a digital assistant in accordance with the present disclosure. Users of digital assistants may oftentimes provide ambiguous commands to their digital assistant devices. Such ambiguities can be a result of any variety of reasons, such as mumbled speech, background noise, incomplete phrasing or terms, poor grammar, and the like. While conventional digital assistants generally require users to dictate predefined commands in a manner that the digital assistant can understand, it would be preferable to provide a digital assistant that can effectively understand ambiguities in, or predict likely interpretations of, the user's spoken commands. The described embodiments are generally related to a digital assistant server device and techniques employed to disambiguate received user commands to prioritize various interpretations and actions that can be performed on the user's digital assistant device.

In accordance with the present disclosure, an "operation" can correspond to a final result, output, or computing operation that is generated, executed, or performed by a digital assistant device based on one or more action datasets selected and interpreted for execution by the digital assistant device. An action dataset can be comprised of one or more instructions that can be interpreted to reproduce operations in response to a received command determined to correspond to the action dataset. In accordance with embodiments described herein, an "action" is described in reference to an operation that is performed in response to an action dataset selected and interpreted for execution. In this regard, an action, by way of a corresponding action dataset, can be performed, invoked, initiated, or executed, among other things. Any reference to an invocation or performance of an "action" can imply that a corresponding action dataset is selected and interpreted for execution (e.g., invoked) by the digital assistant device to reproduce a corresponding set operation(s).

In some embodiments, actions (or the action datasets corresponding thereto) can be created, by the digital assistant device, which can record a series of detected events (e.g., inputs) that are typically provided by a user of the digital assistant device when manually invoking the desired operation (e.g., with manual inputs via a touchscreen or other input method of the digital assistant device). That is, to create a new action dataset, the digital assistant device can invoke a recording mode where a user can simply perform a series of computing operations (e.g., manual touches, click inputs) within one or more applications to achieve a desired result or operation. After the recording is stopped by the user, via a terminating input, the action dataset can store and be associated with a set of command templates corresponding to commands that the user would preferably announce to the digital assistant device when an invocation of the operation is desired. In various embodiments, a command representation can be received as speech data and converted to text (e.g., by a speech engine of the digital assistant device), or received as text input data. In accordance with embodiments described herein, a "command" is referenced herein to describe data, received as speech data or as text data. A "command representation," on the other hand is referenced to describe text data that is received, based on inputs (e.g., keyboard), received speech data converted to text data, or received text data communicated from another computing device. A "command template" is referenced herein to describe a portion of a command representation having defined parameter fields in place of variable terms.

In more detail, one or more terms or keywords in the received command can be defined as a parameter based on input(s) received from the user. A parameter, in accordance with the present disclosure, can be referenced as corresponding to one of a plurality of predefined parameter types, such as but not limited to, genre, artist, title, location, name or contact, phone number, address, city, state, country, day, week, month, year, and more. It is also contemplated that the digital assistant device can access from a memory, or retrieve (e.g., from a server), a set of predefined parameter types that are known or determined to correspond to the application or applications for which an action dataset is being created. In some embodiments, the set of predefined parameter types can be determined based at least in part on corresponding application identifying information. The digital assistant device can extract, based on the defined parameters, the corresponding keywords and generate a command template based on the remaining terms and the defined parameters. By way of example only, if the command was originally received as "play music by Coldplay," and the term "Coldplay" is defined as a parameter of type "artist," a resulting command template generated by the digital assistant device may appear as "play music by <artist>". In this regard, a command template may include the originally received command terms if no parameters are defined, or may include a portion of the originally received command terms with parameter fields defined therein, the defined parameters corresponding to variable terms of a command.

The digital assistant device can receive, among other things, application identifying information, a recorded series of events, and a set command templates, among other things, to generate a new action dataset that can be retrieved, interpreted and/or invoked by the digital assistant device, simply based on a determination, by the digital assistant device, that a received command or command representation is associated with the action dataset. When an action is invoked based on a determination that a received command or command representation corresponds to an action dataset, the digital assistant device can reproduce (e.g., emulate, invoke, execute, perform) the recorded series of events associated with the corresponding action dataset, thereby performing the desired operation. Moreover, in circumstances where a received command or command representation includes a parameter term, and a determination is made that the received command or command representation corresponds to an action dataset having a parameter field that also corresponds to the parameter term, the parameter term can be employed, by the digital assistant device, to perform custom operations while performing the action. For instance, the digital assistant device can input the parameter term as a text input into a field of the application.

In some further embodiments, an action dataset, once created by the digital assistant device, can be uploaded (hereinafter also referenced as "on-boarded") to a remote server for storage thereby. The action dataset can be on-boarded automatically upon its generation or on-boarded manually based on a received instruction, by the digital assistant device. It is contemplated that individuals may want to keep their actions or command templates private, and so an option to keep an action dataset limited to locally-storage may be provided to the user (e.g., via a GUI element). The server, upon receiving an on-boarded action dataset, can analyze the action dataset and generate an associated action signature based on the characteristics and/or contents of the action dataset. Contents of an action dataset can include, among other things, application identifying information, corresponding command templates and parameters, and a recorded series of events. The action signature can be generated by various operations, such as hashing the on-boarded action dataset with a hashing algorithm, by way of example. It is also contemplated that the action signature can be generated by the on-boarding digital assistant device, the generated action signature then being stored in or appended to the action dataset before it is uploaded to the server.

In one aspect, the server can determine that the on-boarded action dataset already exists on the server, based on a determination that the action signature corresponds to the action signature of another action dataset already stored on the server. The server can either dispose of the on-boarded action dataset or merge the on-boarded action dataset (or determined differing portion(s) thereof) with an existing action dataset stored thereby, preventing redundancy and saving storage space. In another aspect, the server can analyze the on-boarded action dataset to determine if its contents (e.g., the recorded events, command templates, metadata) comply with one or more defined policies (e.g., inappropriate language, misdirected operations, incomplete actions) associated with general usage of the digital assistant system. In another aspect, the server can employ machine learning algorithms, among other things, to perform a variety of tasks, such as determining relevant parameter types, generating additional command templates for association with an on-boarded or stored action dataset, comparing similarity of events between on-boarded action datasets to identify and select more efficient routes for invoking an operation, and more.

In some further embodiments, the server can distribute one or more stored actions datasets to a plurality of digital assistant devices in communication with the server. In this way, each digital assistant device can receive action datasets or portions thereof (e.g., command templates) from the server. The action datasets can be distributed to the digital assistant devices in a variety of ways. For instance, in an embodiment, the server can freely distribute any or all determined relevant action datasets to digital assistant devices. In an embodiment, an application profile including a list of applications installed on a digital assistant device can be communicated to the server. Based on the application profile for the digital assistant device, the server can distribute any or all determined relevant action datasets to the digital assistant device. As digital assistant devices can include a variety of operating systems, and versions of applications installed thereon can also vary, it is contemplated that the application profile communicated by a digital assistant device to the server may include operating system and application version information, among other things, so that appropriate and relevant action datasets are identified by the server for distribution to the digital assistant device. For a more granular implementation, an action dataset profile including a list of action datasets or action signatures stored on the digital assistant device can be communicated to the server. In this way, only missing or updated action datasets can be distributed to the digital assistant device.

In some further aspects, the server can receive a command or command representation communicated from any digital assistant device. The command or command representation can be provided to the server as a request to receive, based on the communicated command or command representation, a corresponding action dataset for invocation by the digital assistant device. In various embodiments, the server can search a plurality of stored command templates associated with stored action datasets to determine whether any one or more command templates correspond to the received command or command representation. In order to improve the disambiguation of commands that are unclear or ambiguous, the server can employ, among other things, information extracted from the command or command representation to facilitate the disambiguation process. More specifically, the server can have a defined set of rules stored in memory, with each rule having a relative priority to the other rules. When a command or command representation is received by the server, the server can employ a search engine that searches the action datasets and/or associated command templates stored by the server. It is contemplated that a search result generated by the search engine as a result of the search may return a plurality of action datasets determined potentially relevant to the searched command or command representation. In various embodiments, the server can evaluate each search result (e.g., each action dataset and/or associated command template) in light of the defined set of rules to assign the search result a series of scores (e.g., a modifier) to indicate its relative priority to the other search results. By evaluating the potentially-relevant action datasets and/or associated command templates against the defined set of rules along with the received command or command representation, a most-relevant action dataset can be determined for selection and communication to the requesting digital assistant device.

In some embodiments, a user can simply announce a command to the digital assistant device, and if a corresponding action dataset is not stored on the digital assistant device, the digital assistant device can send the command (or representation) to the server for determination and selection of a set of relevant action datasets, which can then be communicated to the digital assistant device. Provided that the digital assistant device has the corresponding application installed thereon, the digital assistant device can retrieve, from the server, a set of determined most relevant action datasets, without additional configuration or interaction by the user, also reducing server load and saving bandwidth by inhibiting extraneous transfer of irrelevant action datasets. A retrieved set of relevant action datasets can be received from the server for invocation by the digital assistant device. It is further contemplated that if two or more action datasets are determined equally relevant to a received command, each action dataset or reference thereto may be retrieved from the server, and the digital assistant device can provide for display a listing of the determined relevant action datasets for selection and subsequent execution. In other words, if two or more action datasets are determined relevant to the received command, the digital assistant device can request a selection from a user, and receive a selection for a desired action dataset of the two or more determined relevant action datasets. If the determined relevant action datasets are each communicated to the digital assistant device, the digital assistant device can receive the selection and invoke the selected action dataset. Alternatively, the selection can be communicated to the server, so that the selected action dataset is communicated to the digital assistant device for invocation.

In some further embodiments, a user of a digital assistant device can customize command templates associated with an action dataset corresponding to an application installed on their digital assistant device. Put simply, a user can employ the digital assistant (or a GUI thereof) to select an action dataset from a list of action datasets stored on the computing device, select an option to add a new command to the action dataset, and define a new command and any associated parameters for storage in the action dataset. In this regard, the user can add any custom command and parameter that can later be understood by the digital assistant device to invoke the action. In some aspects, the custom command and/or modified action can be on-boarded to the server for analysis and storage, as noted above. In some further aspects, based on the analysis, the server can distribute the custom command and/or at least a portion of the modified action dataset to a plurality of other digital assistant devices. In this regard, the list of understandable commands and corresponding actions can continue to grow and evolve, and be automatically provided to any other digital assistant device.

Accordingly, at a high level and with reference to FIG. 1, an example operating environment 100 in which some embodiments of the present disclosure may be employed is depicted. It should be understood that this and other arrangements and/or features described by the enclosed document are set forth only as examples. Other arrangements and elements (e.g., machines, interfaces, functions, orders, and groupings of functions, etc.) or features can be used in addition to or instead of those described, and some elements or features may be omitted altogether for the sake of clarity. Further, many of the elements or features described in the enclosed document may be implemented in one or more components, or as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

The system in FIG. 1 includes one or more digital assistant devices 110, 115a, 115b, 115c, . . . 115n, in communication with a server 120 via a network 130 (e.g., the Internet). In this example, the server 120, also in communication with the network 130, is in communication with each of the digital assistant devices 110, 115a-115n, and can also be in communication with a database 140. The database 140 can be directly coupled to the server 120 or coupled to the server 120 via the network 130. The digital assistant device 110, representative of other digital assistant devices 115a-115n, is a computing device comprising one or more applications 112 and a digital assistant module 114 installed and/or executing thereon.

The one or more applications 112 includes any application that is executable on the digital assistant device 110, and can include applications installed via an application marketplace, custom applications, web applications, side-loaded applications, applications included in the operating system of the digital assistant device 110, or any other application that can be reasonably considered to fit the general definition of an application or mobile application. On the other hand, the digital assistant module 114 can provide digital assistant services installed on the digital assistant device 110 or provided by the server 120 via the network 130, or can be implemented at least partially into an operating system of the digital assistant device 110. In accordance with embodiments described herein, the digital assistant module 114 provides an interface between a digital assistant device 110 and an associated user (not shown), generally via a speech-based exchanged, although any other method of exchange between user and digital assistant device 110 (e.g., keyboard input, communication from another digital assistant device or computing device) remains within the purview of the present disclosure.

When voice commands are received by the digital assistant device 110, the digital assistant module 114 can convert the speech command to text utilizing a speech-to-text engine (not shown) to extract identified terms and generate a command representation. The digital assistant module 114 can receive the command representation, and determine that the command representation corresponds to at least one command template of at least one action dataset stored on the digital assistant device. In some embodiments, the digital assistant module can generate an index of all command templates stored on the digital assistant device 110 for faster searching and comparison of the received command representation to identify a corresponding command template, and thereby a corresponding action dataset. Each indexed command template can be mapped to a corresponding action dataset, which can be interpreted for execution in response to a determination of a confirmed match with the received command representation.

By way of brief overview, a command template can include one or more keywords and/or one or more parameters that each have a corresponding parameter type. Each command template generally corresponds to an operation that can be performed on one or more applications 112 installed on a digital assistant device 110. Moreover, a plurality of command templates can correspond to a single operation, such that there are multiple equivalent commands that can invoke the same operation. By way of example only, commands such as "check in," check into flight," "please check in," "check into flight now," "check in to flight 12345," and the like, can all invoke the same operation that, by way of example only, directs the digital assistant module 114 to execute an appropriate airline application on the digital assistant device 110 and perform a predefined set of events or computer operations to achieve the same result.

The aforementioned commands, however, may lack appropriate information (e.g., the specific airline). As one of ordinary skill may appreciate, a user may have multiple applications 112 from various vendors (e.g., airlines) associated with a similar service (e.g., checking into flights). A digital assistant device 110 in accordance with embodiments described herein can provide features that can determine contextual information associated with the digital assistant device 110, or its associated user, based on historical use of the digital assistant device 110, profile information stored on the digital assistant device 110 or server 120, stored parameters from previous interactions or received commands, indexed messages (e.g., email, text messages) stored on the digital assistant device, and a variety of other types of data stored locally or remotely on a server, such as server 120, to identify a most relevant parameter and supplement a command to select a most relevant action dataset. More specific commands, such as "check into FriendlyAirline flight," or "FriendlyAirline check in," and the like, where a parameter is specifically defined in the command, can be recognized by the digital assistant module 114.

One or more recognizable commands and corresponding action datasets can be received by the digital assistant device 110 from the server 120 at any time, including upon installation, initialization, or invocation of the digital assistant module 114, after or upon receipt of a speech command by the digital assistant module 114, after or upon installation of a new application 112, periodically (e.g., once a day), when pushed to the digital assistant device 110 from the server 120, among many other configurations. It is contemplated that the action datasets received by the digital assistant device 110 from the server 120 can be limited based at least in part on the applications 112 installed on the digital assistant device 110, although configurations where a larger or smaller set of action datasets received are contemplated.

In the event an action dataset is determined not available for a particular application 112 installed on the digital assistant device 110, digital assistant module 114 can either redirect the user to a marketplace (e.g., launch an app marketplace application) to install the appropriate application determined by the server 120 based on the received command, or can invoke an action training program that prompts a user to manually perform tasks on one or more applications to achieve the desired result, the tasks being recorded and stored into a new action dataset by the digital assistant device 110. The digital assistant module 114 can also receive one or more commands from the user (e.g., via speech or text) to associate with the action dataset being generated. If the command includes variable parameters (e.g., optional fields), the action training program can facilitate a definition of such parameters and corresponding parameter types to generate command templates for inclusion in the action dataset being generated. In this way, a command template(s) is associated with at least the particular application designated by the user and also corresponds to the one or more tasks manually performed by the user, associating the generated command template to the task(s) and thus the desired resulting operation.

In some instances, the server 120 can provide one or more determined most-relevant action datasets to the digital assistant device 110 based on the received command. As described, the server 120 can store and index a constantly-growing and evolving plurality of crowd-sourced action datasets submitted by or received from any of digital assistant devices 115a-115n also independently having a digital assistant module 114 and any number of applications 112 installed thereon. The digital assistant devices 115a-115n may have any combination of applications 112 installed thereon, and any generation of action datasets performed on any digital assistant device 110, 115-115n can be communicated to the server 120 to be stored and indexed for mass or selective deployment, among other things. In some aspects, the server 120 can include any variety of search engines, relevance engines, and/or machine-learned algorithms to provide a level of quality assurance on command templates included in on-boarded action datasets and/or the tasks and operations performed before they are distributed to other digital assistant devices via the network 130.

When the digital assistant module 114 receives, from the server 120, or locally selects a relevant action dataset based on the communicated command or command representation, the digital assistant module 114 can generate an overlay interface that can mask any or all visual outputs associated with the determined action or the computing device generally. The generation of the overlay interface can include a selection, by the digital assistant module 114, of one or more user interface elements that are stored in a memory of the digital assistant device 110 or server 120, and/or include a dynamic generation of the user interface element(s) by the digital assistant module 114 or server 120 based on one or more portions of the received command, command representation, and/or obtained contextual data (e.g., determined location data, user profile associated with the digital assistant device 110 or digital assistant module 114, historical data associated with the user profile, etc.) obtained by the digital assistant device 110, digital assistant module 114, and/or server 120. The selected or generated one or more user interface elements can each include content that is relevant to one or more portions (e.g., terms, keywords) of the received command or command representation. In the event of dynamic generation of user interface elements, such elements can be saved locally on the digital assistant device 110 or remotely on the server 120 for subsequent retrieval by the digital assistant device 110, or can be discarded and dynamically regenerated at any time.

Example operating environment depicted in FIG. 1 is suitable for use in implementing embodiments of the invention. Generally, environment 100 is suitable for creating, on-boarding, storing, indexing, crowd-sourcing, selecting, distributing, and invoking actions or action datasets. Environment 100 includes digital assistant device 110, digital assistant server device 120 (hereinafter also referenced as "server" or "digital assistant server") and network 130. Digital assistant device 110 can be any kind of computing device having a digital assistant module installed and/or executing thereon, the digital assistant module being implemented in accordance with at least some of the described embodiments. For example, in an embodiment, digital assistant device 110 can be a computing device such as computing device 700, as described below with reference to FIG. 7. In embodiments, digital assistant device 110 can be a personal computer (PC), a laptop computer, a workstation, a mobile computing device, a PDA, a cell phone, a smart watch or wearable, or the like. Any digital assistant device described in accordance with the present disclosure can include features described with respect to the digital assistant device 110. In this regard, a digital assistant device can include one or more applications 112 installed and executable thereon. The one or more applications 112 includes any application that is executable on the digital assistant device, and can include applications installed via an application marketplace, custom applications, web applications, side-loaded applications, applications included in the operating system of the digital assistant device, or any other application that can be reasonably considered to fit the general definition of an application. On the other hand, the digital assistant module can be an application, a service accessible via an application installed on the digital assistant device or via the network 130, or implemented into a layer of an operating system of the digital assistant device 110. In accordance with embodiments described herein, the digital assistant module 114 can provide an interface between a digital assistant device 110 and a user (not shown), generally via a speech-based exchange, although any other method of exchange between user and digital assistant device may be considered within the purview of the present disclosure.

Similarly, digital assistant server device 120 ("server") can be any kind of computing device capable of facilitating the on-boarding, storage, management, indexing, searching, relevance determination, and distribution of crowd-sourced action datasets. For example, in an embodiment, digital assistant server device 120 can be a computing device such as computing device 700, as described below with reference to FIG. 7. In some embodiments, digital assistant server device 120 comprises one or more server computers, whether distributed or otherwise. Generally, any of the components of environment 100 may communicate with each other via a network 130, which may include, without limitation, one or more local area networks (LANs) and/or wide area networks (WANs). Such networking environments are commonplace in offices, enterprise-wide computer networks, intranets, and the Internet. The server 120 can include or be in communication with a data source 140, which may comprise data sources and/or data systems, configured to make data available to any of the various constituents of the operating environment 100. Data sources 140 may be discrete from the illustrated components, or any combination thereof, or may be incorporated and/or integrated into at least one of those components.

Referring now to FIG. 2, a block diagram 200 of an exemplary digital assistant device 210 suitable for use in implementing embodiments of the invention is shown. Generally, digital assistant device 210 (also depicted as digital assistant device 110 of FIG. 1) is suitable for receiving commands or command representations, selecting action datasets to execute by matching received commands to command templates of action datasets, or determining that no action datasets correspond to received commands, interpreting a selected action dataset to execute the associated operation, generating new action datasets, and sending action datasets to or receiving action datasets from a digital assistant server, such as server 120.

Digital assistant device 210 can include, among other things, a command receiving component 220, an action matching component 230, an action executing component 240, a training component 250, and a server interfacing component 260. The command receiving component 220 can receive a command, either in the form of speech data or text data. The speech data can be received via a microphone of the digital assistant device 210, or another computing device paired to or in communication with the digital assistant device 210. The command receiving component 220, after receiving the speech data, can employ a speech-to-text engine of the digital assistant device 210 to generate a command representation (e.g., a text string of the command). Text data received by command receiving component 220, on the other hand, can be received via a virtual keyboard or other input method of the digital assistant device 210, and similarly, can be received from another computing device paired to or in communication with the digital assistant device 210. Received text data is already in the form of a command representation, and is treated as such. In various embodiments, command receiving component 210 can be invoked manually by a user (e.g., via an input to begin listening for or receiving the command), or can be in an always-listening mode.

Based on a command representation being received, action matching component 230 can determine whether one or more action datasets stored on the digital assistant device 210 include a command template that corresponds to or substantially corresponds (e.g., at least 90% similar) to the received command representation. In some aspects, a corresponding command template can be identified, and the action dataset of which the corresponding command template is stored in is selected for interpretation by action executing component 240. In some other aspects, a corresponding command template cannot be identified, and either the training component 250 can be invoked, or the received command is communicated to the digital assistant server (depicted as server 120 of FIG. 1 and digital assistant server 310 of FIG. 3) via the server interfacing component 260.

The action executing component 240 can receive a selected action dataset, either selected by digital assistant device 210 from local storage, by the digital assistant server from storage accessible thereto, or selected from a list presented by digital assistant device 210. The action executing component 240 can, from the received action dataset, interpret event data, which may include interpretable instructions, executable code, links, deep links, references to GUI elements, references to screen coordinates, field names, or other pieces of data that can correspond to one or more reproducible operations, tasks, or events associated with selected action dataset. When the event data is interpreted, the action executing component 240 can reproduce the operations that were recorded when the action dataset was initially generated, by any remote computing device, or any other digital assistant device such as digital assistant device 210. In some aspects, the event data can include time delays, URLs, deep links to application operations, or any other reproducible operation that can be accessed, processed, emulated, or executed by the action executing component 240. In some aspects, events such as clicks or touch inputs, can be reproduced on the digital assistant device 210, based on the interpreted event data stored in the invoked action dataset.

The training component 250 can facilitate the generation of an action dataset, among other things. When the training component 250 is invoked, an indication, such as a GUI element, indicating that an action recording session has begun may be presented for display. A prompt to provide the tasks or events required to perform the desired operation can also be presented for display. In this regard, a user can begin by first launching an application for which the operation is associated with, and proceed with providing inputs to the application (i.e., (performing the requisite tasks). The inputs can be recorded by the digital assistant device 210, and the training component 250 can listen for, parse, identify, and record a variety of attributes of the received inputs, such as long or short presses, time delays between inputs, references to GUI elements interacted with, field identifiers, application links activated based on received inputs (e.g., deep links), and the like. The recorded inputs and attributes (e.g., event data) can be stored, sequentially, in an event sequence, and stored into a new action dataset. The application launched is also identified, and any application identifying information, such as operating system, operating system version, application version, paid or free version status, and more, can be determined from associated metadata and also stored into the new action dataset. When the desired operation is completed (i.e., all requisite tasks/events performed), a user can activate a training termination button, which can be presented as a floating button or other input mechanism that is preferably positioned away from an active portion of the display. Other termination methods are also contemplated, such as voice activated termination, or motion activated termination, without limitation.

The training component 250 can further request that the user provide a set of commands that correspond to the desired operation. A command can be received via speech data and converted to a command representation by a speech to text engine, or received via text input as a command representation, among other ways. When the set of commands is provided and stored as command representations, the training component 250 can further prompt the user to define any relevant parameters or variables in the command representations, which can correspond to keywords or values that may change whenever the command is spoken. In this regard, a user may select one or more terms included in the received command representations, and define them with a corresponding parameter type selected from a list of custom, predefined, or determined parameter times, as described herein. The training component 250 can then extract the selected one or more terms from a command representation defined as parameter(s), replacing them with parameter field identifier(s) of a corresponding parameter type, and store the resulting data as a command template. The training component 250 can then generate the action dataset from the recorded event sequence, the application identifying information, and the one or more defined command templates. In some embodiments, the training component 250 can generate an action signature or unique hash based on the generated action dataset or one or more portions of data included therein. The action signature can be employed by the digital assistant server to determine whether the action dataset or data included therein is redundant, among other things.

Looking now to FIG. 3, a block diagram 300 of an exemplary digital assistant server 310 suitable for use in implementing embodiments of the invention is shown. Generally, digital assistant server 310 (also depicted as server 120 of FIG. 1) is suitable for establishing connections with digital assistant device(s) 210, receiving generated action datasets, maintaining or indexing received action datasets, receiving commands or command representations from one or more digital assistant devices, searching action datasets maintained and/or stored in memory, determining relevance of searched action datasets, and distributing selected and/or determined relevant action datasets to digital assistant devices, such as digital assistant device 210. Digital assistant server 310 can include, among other things, an on-boarding component 320, an indexing component 330, a maintenance component 340, a searching component 345, a relevance component 350, and a distribution component 360, among other things.

The on-boarding component 320 can receive action datasets generated by one or more digital assistant devices 210 in communication therewith. In some aspects, the on-boarding component can generate an action signature for a received action dataset, similar to how a digital assistant device may, as described herein above. Before storing the received action dataset, the action signature can be searched utilizing the indexing component 330, which maintains an index of all action datasets stored by the digital assistant server 310. The indexing component 330 facilitates quick determination of uniqueness of received action datasets, and reduces redundancy and processing load of the digital assistant server 310.

On a similar note, the maintenance component 340 can determine whether any portion of a received action dataset is different than action datasets already stored on or by the server (e.g., in a database), and extract such portions for merging into the existing corresponding action datasets. Such portions may be identified in circumstances where only command templates are hashed in the action signature, or where each portion of the action dataset (e.g., application identifying information, command template(s), event sequence) is independently hashed either by training component 240 of FIG. 2 or on-boarding component 310 of FIG. 3, to more easily identify changes or differences between action datasets. By way of example, in some embodiments, a received action dataset can include separate hashes for its application identifying information, event sequence, and command template(s). In this regard, the digital assistant server 310 can employ the indexing component 330 and maintenance component 340 to quickly identify, for instance, that the received action data corresponds to a particular application and operation, or that the command template(s) are different than those stored in the stored action dataset by virtue of the command template hashes being different. Similarly, the independent hash signatures for each portion of data included in an action dataset can facilitate efficient determination of changes or differences between any combination of data portions in a received action dataset and a stored action dataset.

Searching component 345 can include a search engine or a search tool that receives a query, such as a command or command representation received from a digital assistant device, searches a memory (e.g., a database) of stored action datasets with the received query, and generates a search result including one or more potentially relevant action datasets identified based on the received query. In various embodiments, each search result can correspond to or include a potentially relevant action dataset, and can be generated based on a determination, by the searching component 345, that one or more command templates associated with the potentially relevant action dataset corresponds to the received command or command representation. In some embodiments, a command template can be determined to correspond to a received command or command representation based on a comparison of keywords, terms, parameters, or phrases in the received command or command representation to keywords, terms, phrases, parameter fields, or parameter types in the command template. Among other things, contextual data associated with a digital assistant device requesting the action dataset(s) can also be employed to determine corresponding command templates based on received commands or command representations.

Relevance component 350 can determine, based on commands or command representations received by a digital assistant device 210, a likelihood that a particular command template corresponds to the received command or command representation. While a variety of relevance determining methods may be employed, a machine learning application may be considered, though a ranking of determined most similar command templates to a command or command representation received from a digital assistant device 210 can also facilitate a determination of relevant one or most relevant command templates. Determined most-relevant command templates can thereby facilitate the selection of one or more most relevant action datasets to be distributed to the command-sending digital assistant device 210.

In some embodiments, relevance component 350 can include and access a defined set of rules, employable by the relevance component 350 to assign scores to each search result, indicating its relative priority. These scores can be included in a "modifier" of a corresponding search result (e.g., action dataset), which enables the relevance component 350 to rank the potential action dataset with respect to other candidate potential action datasets included in the plurality of search results.

One exemplary first rule that can be employed by relevance component 350 can enable relevance component 350 to determine whether the received command or command representation includes a direct reference to a particular application name. By way of example, a command representation can include "play song in Spotify," where the term "Spotify" can be determined as a direct reference (e.g., strong mention) to the Spotify application. A command template can have corresponding keywords "play song in" followed by a parameter field <application name>. The parameter "Spotify" can be employed as a search query to determine whether the application name corresponds to one of a plurality of existing application names. The application name can be searched from a variety of resources, such as an application marketplace database, a list of applications known to be installed on the requesting digital assistant device 210, or a list of applications stored and/or supported by the digital assistant server 310, or a list of applications stored by the digital assistant server 310. Thus, by way of example, if the keywords or phrase(s) of the command representation is determined to correspond directly to the keywords or phrase(s) of an existing command template, and the parameter (e.g., "Spotify") included in the parameter field (e.g., "<application name>") portion of the command representation is determined to correspond to a term or phrase included in the plurality of parameters in the database of defined application names (e.g., "application names"), the relevance component 350 can determine that the rule is satisfied and assign a corresponding score to the search result or the modifier of the action dataset associated with the command template.

Another exemplary second rule that can be employed by relevance component 350 can enable relevance component 350 to determine whether the received command or command representation directly corresponds to (e.g., matches) a dictionary-based template. A dictionary-based template can correspond to a command template stored by the digital assistant server 310. The dictionary-based template, however, can reference a dictionary of known parameters that correspond to a defined parameter field included in the dictionary-based template. By way of example, a command representation can include the phrase "play U2." The term "U2" can be one of a plurality of parameters in a database of defined music groups or artists, such as one titled "music artists." In this regard, the dictionary-based template may include the keyword "play," followed by the parameter field "<music artist>". Thus, by way of example, if the relevance component 350 can determine that the parameter (e.g., "U2") included in the parameter field (e.g., "<music artist>") corresponds to a term or phrase included in the plurality of parameters in the database of defined music groups or artists (e.g., "music artists"), the relevance component 350 can determine that the rule is satisfied and assign a corresponding score to the search result or the modifier of the action dataset associated with the command template.

Another exemplary third rule that can be employed by relevance component 350 can enable relevance component 350 to determine whether the received command or command representation only partially corresponds to (e.g., has a weak mention) of a particular application. By way of example, a command representation can include "play Spotify songs," where the term "Spotify" can be determined as a direct (e.g., strong) reference to the Spotify application. Unlike the strong mention rule, a search for a corresponding command template may determine that a direct match of the keywords or phrases preceding the parameter in the command representation does not exist, or in other words, that only a portion of the command representation corresponds to a stored command template (e.g., "weak mention"). Similar to the strong mention rule, the relevance component 350 can employ parameter "Spotify" as a search query to determine whether the application name corresponds to one of a plurality of existing application names. Thus, by way of example, if relevance component 350 determines that the parameter (e.g., "Spotify") included in the parameter field (e.g., "<application name>") corresponds to a term or phrase included in the plurality of parameters in the database of defined application names (e.g., "application names"), the relevance component 350 can determine that the rule is satisfied and can assign a corresponding score to the search result or the modifier of the action dataset associated with the command template.

Another exemplary fourth rule that can be employed by relevance component 350 can enable relevance component 350 to determine whether the received command or command representation corresponds to a plurality of command templates. By way of example, a command representation can include "message Bob where are you?," where the term "Bob" can be determined as a direct (e.g., strong) reference to a contact in a contact list of the requesting digital assistant device. A search for a corresponding command template may determine that a direct match of the keywords or phrases and the parameter in the command representation corresponds to at least two command templates, such as "message <username>" and "message <username><message>". The relevance component 350 can employ parameter "Bob" as a search query to determine whether the recipient's name corresponds to one of a plurality of contacts in a contact list associated with the digital assistant device. Thus, by way of example, if relevance component 350 determines that the keywords or phrases "message" corresponds to more than one command template, that a first parameter corresponds to each of those command templates, but that one particular command template includes an additional parameter field that can correspond to the remaining parameters of the received command representation (e.g., corresponding to the <message> parameter field), the relevance component 350 can determine that the rule is satisfied and can assign a corresponding score to the search result or the modifier of the action dataset associated with the command template having the greater number of parameter fields (e.g., "message <username><message>").

Another exemplary fifth rule that can be employed by relevance component 350 can enable relevance component 350 to determine whether the received command or command representation includes keywords or phrases that correspond to parameter field(s) of a command template, but that the remaining keywords or phrases do not directly correspond to the keywords or phrases of the command template. By way of example, a command representation can include "show me my tickets to U2," where the terms "show," and "tickets," can be determined to correspond to the command template "show tickets to <artist name>" and the parameter "U2" can be determined to correspond to the <artist name> parameter field. Here, the remaining terms "me," "my," and "to," are extraneous terms that are determined not to have a direct correspondence to the command template "show tickets to <artist name>" Thus, by way of example, if relevance component 350 determines that the command representation does not exactly match a command template, but that all parameters of the command template can be matched to one or more portions of the command representation, the relevance component 350 can determine that the rule is satisfied and can assign a corresponding score to the search result or the modifier of the action dataset associated with the command template determined to have the parameter fields matching each parameter of the command representation.

Another exemplary sixth rule that can be employed by relevance component 350 can enable relevance component 350 to determine whether the received command or command representation includes keywords or phrases that correspond to keywords or phrases of a command template, but that the remaining keywords or phrases do not directly correspond to the parameter fields of the command template, or in other words, a search of keywords or phrases in the parameter field portion(s) of the command representation indicates that the keywords or phrases do not match any parameters in a plurality of known parameters. By way of example, a command representation can include the phrase "play the trumpet show." A command template may include the keyword "play," followed by any parameter field, such as "<music artist>", "<movie title>", "<song name>", "<show title>", "<genre name>", and the like. Thus, by way of example, the relevance component 350 can determine that the term "play" from the command representation directly correspond to a command template in accordance with any of the foregoing examples, yet the relevance component 350 also determines that the parameter (e.g., "the trumpet show") included in the parameter field does not match or correspond to any parameter included in any plurality of parameters in the database of defined parameter types associated with the parameter field. In this regard, the relevance component 350 can determine that the rule is satisfied and assign a negative corresponding score to the search result or the modifier of the action dataset associated with the command template, thereby suppressing the action dataset associated with the command template.

Another exemplary seventh rule that can be employed by relevance component 350 can enable relevance component 350 to determine whether the received command or command representation directly corresponds to (e.g., matches) a wildcard template. A wildcard template can correspond to a command template stored by the digital assistant server 310. The wildcard template, however, can include a parameter field that can generally accept any keyword or phrase included in the command representation. By way of example, a command representation can include the phrase "text Bob how are you?" A search for a corresponding command template may determine that a direct match of the keywords or phrases and the parameter in the command representation corresponds to at least a wildcard template, such as "text <message>". Thus, by way of example, if relevance component 350 determines that the keyword or phrase "text" corresponds to a keyword or phrase of at least a wildcard template, and that the parameter field "<message>" of the wildcard template can correspond to any other keywords or phrases (e.g., "Bob how are you?") included in the command representation, the relevance component 350 can determine that the rule is satisfied and assign a corresponding score to the search result or the modifier of the action dataset associated with the wildcard template. In some embodiments, the relevance component 350 can assign specific values, whether whole numbers or decimal values (e.g., 0.1, 0.01, 0.001, 0.0001, etc.) depending on implementation, to a modifier of an action dataset (e.g., search result) included in a plurality of potential action datasets identified based on a received command or command representation. Such values can be assigned to the modifier in a specific order, based on how each action dataset is to be boosted and/or ranked in accordance with a desired priority. By way of non-limiting example only, the following scores can be employed as modifiers based on a satisfaction of each the first through seventh rules described herein above. For the first exemplary rule, a score of 0.1 can be assigned or appended to the modifier. For the second exemplary rule, a score of 0.01 can be assigned or appended to the modifier. For the third exemplary rule, a score of 0.001 can be assigned or appended to the modifier. In some aspects, the score for the third exemplary rule can be assigned or appended to the modifier if a score already assigned to the application dataset, by the search engine, is greater than a predefined percentage (e.g., 20% to 40%) of a score already assigned or appended to a modifier (e.g., by the search engine) of a determined highest scored action dataset. For the fourth exemplary rule, a score of 0.0001 can be assigned or appended to the modifier of the action dataset associated with the command template determined to have the greatest number of parameters. Also, for the fourth exemplary rule, a score of 0.0005 can be assigned or appended to the modifier of the action dataset associated with the command template determined to not to have the greatest number of parameters. In some embodiments, for the fourth exemplary rule, a distribution of different scores less than 0.0001 can be assigned or appended to the modifier of each action dataset associated with the command template determined to not to have the greatest number of parameters, which may vary depending on a number of action datasets determined to not to have the greatest number of parameters. For the fifth exemplary rule, a score of 0.0001 can be assigned or appended to the modifier. In some aspects, the score for the fifth exemplary rule can be assigned or appended to the modifier if a score already assigned to the application dataset, by the search engine, is greater than a predefined percentage (e.g., 20%) of a score already assigned or appended to a modifier (e.g., by the search engine) of a determined highest scored action dataset. For the sixth exemplary rule, a score of 0.0000001 can be assigned or appended to the modifier. For the seventh exemplary rule, a score of 0.000001 can be assigned or appended to the modifier. As the foregoing scores are merely exemplary, it is contemplated that any value or scores can be defined for assignment or appendage to a modifier of an action dataset, and that each value or score can be changed based on a desired relevance determination made by the digital assistant server described in accordance with the present disclosure. In various embodiments, each score for a particular rule can be remain relative in value to the scores of other rules, or relative values can be modified based on the desired relevance determination made by the digital assistant server.

The distribution component 360 can distribute or communicate to one or more digital assistant devices 210, determined relevant or most relevant action datasets, determined new action datasets, determined updated action datasets, any portion and/or combination of the foregoing, or generated notifications corresponding to any portion and/or combination of the foregoing, among other things, based on a variety of factors. For instance, the distribution component 360 can include features that determine, among other things, which applications are installed on a digital assistant device 210. Such features can enable the digital assistant server 310 to determine which action datasets or portions thereof are relevant to the digital assistant device 210, and should be distributed to the digital assistant device 210. For instance, a digital assistant device 210 profile (not shown) describing all applications currently installed or executable by a digital assistant device 210, can be maintained (e.g., stored, updated) by the digital assistant server 310. The profile can be updated periodically, manually, or dynamically by a server interfacing component 260 of the digital assistant device 210 (e.g., whenever the digital assistant is in communication with and sends a command to the digital assistant server 310, or whenever an application is installed or updated on the digital assistant device 210). The distribution component 360 can distribute or communicate notifications, action datasets, or portions thereof, in a variety of ways, such as pushing, sending in response to received requests for updates, sending in response to established communications with a digital assistant device 210, or by automatic wide scale (e.g., all digital assistant devices) or selective scale (e.g., region, location, app type, app name, app version) distribution, among other things.

Turning now to FIG. 4, a data structure 400 of an exemplary action dataset 410 in accordance with some of the described embodiments is illustrated. The depicted data structure is not intended to be limiting in any way, and any configuration of the depicted data portions of information may be within the purview of the present disclosure. Further, additional data portions or less data portions may be included in an action dataset 410 also remaining within the purview of the present disclosure.

In the depicted data structure 400, the action dataset 410 includes application identifying information 420, recorded event sequence data 430, and command templates 440. In some embodiments, the action dataset 410 further includes hash(es) 450, which can include a hash value generated based on the entire action dataset 410, or hash values generated based on any portion of the aforementioned data portions 420, 430, 440, among other things. The action dataset 410 can be generated by training component 250 of digital assistant device 210 of FIG. 2 and/or received from distribution component 360 of digital assistant server 310 of FIG. 3.

The application identifying information 420 can include information about a particular application that is required for execution to perform a particular operation for which the action dataset 410 was created. Exemplary pieces of application identifying information 420 are depicted in identifying information 425, which can include any one or more of an operating system (OS) name for which the particular application is executed on, an OS version of the aforementioned OS, a defined native language of the aforementioned OS, a name of the particular application, a version of the particular application, and the like. It is contemplated that the application identifying information 420 is required and checked (e.g., by the digital assistant server 310 of FIG. 3), before an action dataset 410 is distributed to a digital assistant device (e.g., digital assistant device 210 of FIG. 2) and employed by the digital assistant device to ensure that the action dataset 410 is compatible with, or can be correctly interpreted by action executing component 240 of FIG. 2, so that the corresponding and desired operation is performed by the digital assistant device 210.

The recorded event sequence data 430 can include any or all task or event-related data that was obtained, received, or determined by the digital assistant device (e.g., via training component 250 of FIG. 2) responsible for generating the action dataset 410. As noted herein, the recorded event sequence data can include timing attributes of received inputs (e.g., delays before or in between successive inputs, duration of inputs, GUI elements interacted with, relative positions of GUI elements, labels or metadata of GUI elements, scroll inputs and distances, links or URLs accessed activated, detected activation of application deep links activated in response to received inputs, and more). In some instances, the recorded event sequence data 430 may include conditions that require actual user intervention before subsequent events or tasks are resumed. For instance, secured login screens may require that a user input username and password information before an application is executed. In this regard, the recorded event sequence data 430 may include a condition corresponding to when user authentication has occurred, and instructions (e.g., interpretable by action executing component 240) to proceed with the tasks or events in the recorded event sequence data 430 based upon an occurrence of the condition. In various implementations, it is contemplated that the action executing component 240 of FIG. 2 can parse metadata, GUI elements, or other information from an executing application to determine when certain events occur or conditions are met. In this regard, additional conditions may be included in the recorded event sequence data 430 that require prior events or tasks to be completed, or certain GUI elements be displayed or interacted with, or any other conditions to be met, before subsequent events or tasks are performed by the action executing component 240 of FIG. 2.

Figure 5:
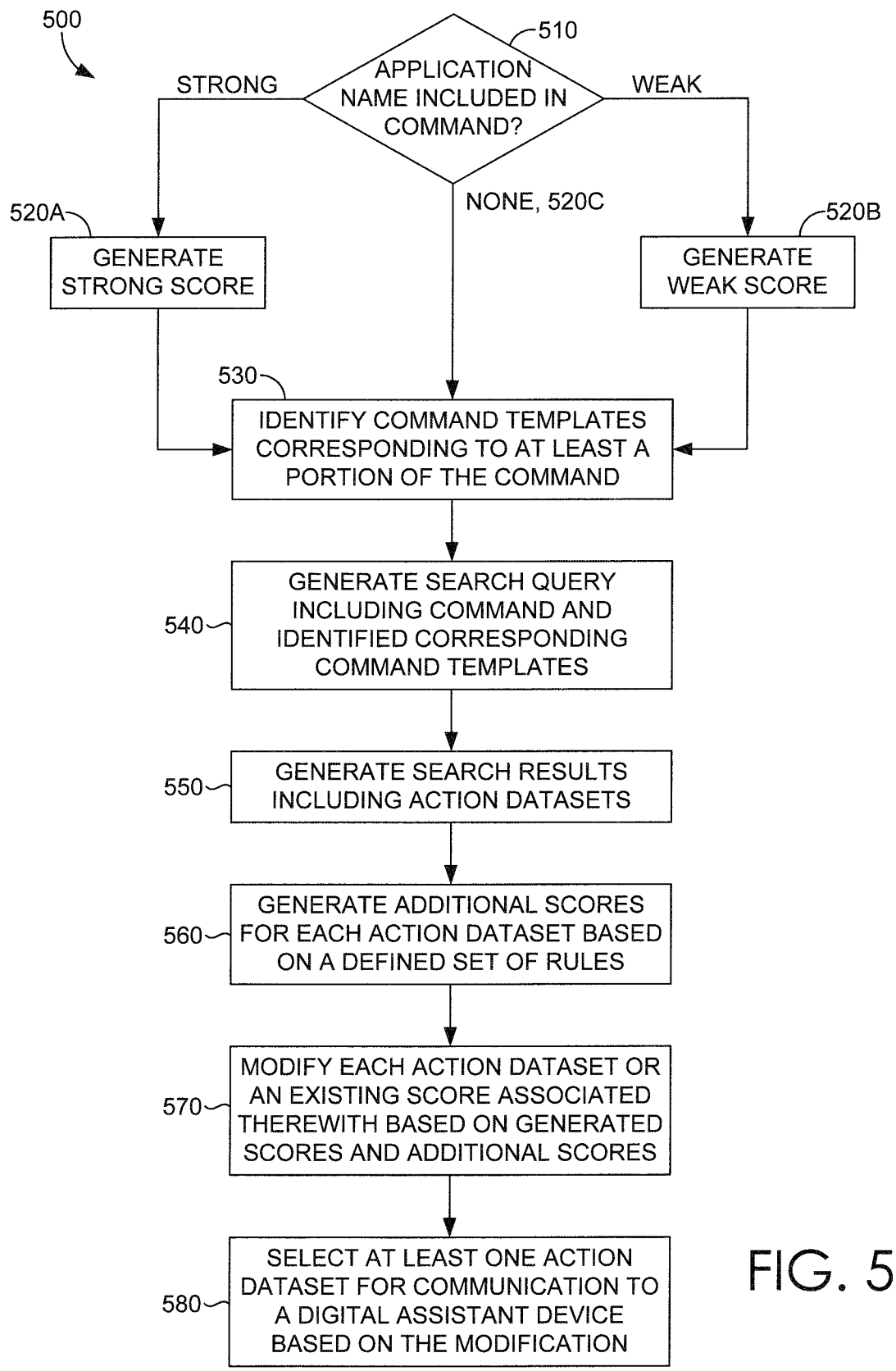
FIG. 5 is a flow diagram showing a method for determining, selecting, and communicating most-relevant actionable operations for distribution in a crowd-sourced digital assistant network, according to various embodiments of the present invention.
Figure 6:
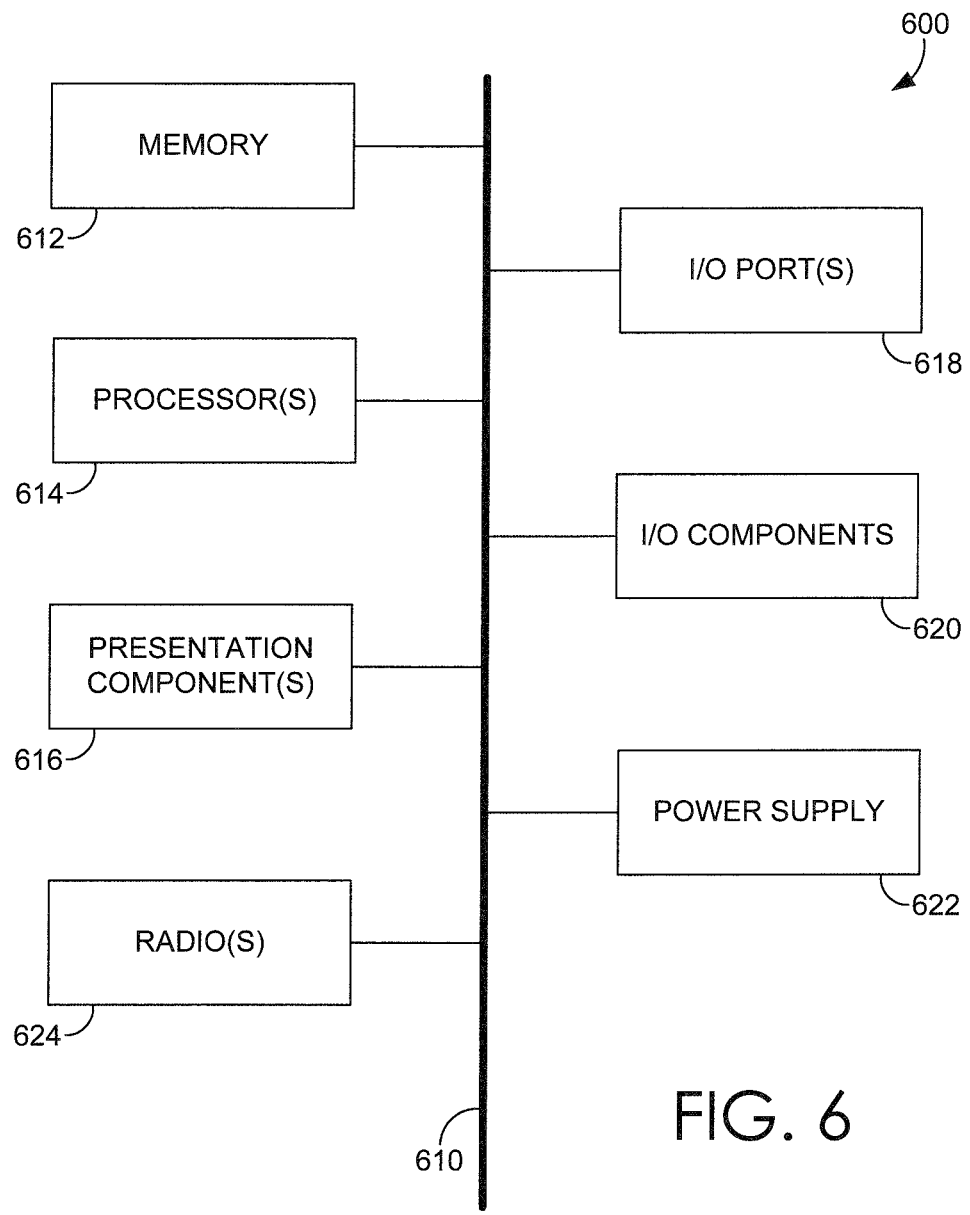
FIG. 6 is a block diagram of an exemplary computing environment suitable for use in implementing embodiments of the present invention.

Turning now to FIG. 5, an embodiment of a process flow or method 500 for effectively determining and selecting most-relevant actionable operations (i.e., action datasets) for distribution in a crowd-sourced digital assistant network is described. As described herein, a server device, such as digital assistant server 310 of FIG. 3, can receive a command or a command representation transmitted from a digital assistant device, such as digital assistant device 210 of FIG. 2. The command or command representation can include, among other things, an alphanumeric text representation of a spoken command that was obtained by the digital assistant device. To this end, the digital assistant device can either receive the alphanumeric text representation from another computing device, or employ a speech-to-text engine or $3^{rd}$-party service to convert the detected spoken command to alphanumeric text before it is communicated to the server device. After the command representation is received, the server device can employ a search engine, such as searching component 345, to search any number of databases, known or defined parameters, command templates, action datasets, dictionaries, or any other type of data or feature described in the present disclosure, at any time. The search engine can employ any one or more portions of a command representation, an action dataset, a command template, and the like, as queries to search any of the foregoing types of data or features. The search engine can generate a search result that includes any associated or at least partially associated types of data, which can also correspond to any of the foregoing types of data or features.

As is described herein, the command representation can include any number of terms, keywords, or phrases, any of which can be determined by the server device as corresponding to a keyword, phrase, or parameter field of one or more command templates stored and searchable by the server device. Further, a command template can include any number of terms, keywords, or parameter fields (of any parameter type), where each parameter field of a specific parameter type can be associated with a plurality of defined or known parameters. In this way, any number of terms, keywords, or phrases of a command representation can be matched to terms, keywords, or phrases of one or more command templates, and also to one or more of the plurality of defined or known parameters determined to be associated with the one or more command templates based on the defined parameter types and the defined or known parameters associated therewith.

The search engine described herein can employ any search technology generally known by one of ordinary skill in the art. However, it is the specific processes, data types, and modification of results described herein that distinguish the present disclosure from conventional systems. The search result(s) generated by the search engine are provided to the server device, so that priorities of potential action datasets included in the search result can be boosted and/or rearranged based on a defined set of rules that each relate to a relevance determination of each potential action dataset to the received command representation. In some embodiments, the search engine can generate and define a score for association with each potential action dataset included in the search result. The score can be generated based on a variety of factors, such as matching accuracy, among other things. In some further embodiments, the relevance component 350 can define and redefine the priorities of action datasets included in the search result, as will be described.

In some embodiments, at step 510, the server device can determine whether the command representation (e.g., "find hotels in san jose using hotels.com"), received from a digital assistant device, includes a strong mention or a weak mention to one of a plurality of known applications or application names. The server device can either employ the entire command representation as a query, or parse the received command representation into one or more portions that are each employed as an independent query. A query can be employed to search a database of known application names, so that a determination can be made on whether the received command representation includes a reference to any application name in the database of known application names. As described herein, the database can be maintained by the server device, or can be searchable by the server device (e.g., an application marketplace).

In some embodiments, specific terms or characteristics (e.g., prepositions) thereof included in the command representation can be detected and employed, by the server device, to determine a likely reference to an application name, or in other words, that a strong mention of the application name follows the preposition or is otherwise included in the command representation. In this regard, and by way of example, "show messages in WhatsApp" can indicate a strong preposition (e.g., "in") to invoke the WhatsApp application. In another example "book a hotel using Hotels.com" can indicate a strong preposition (e.g., "using") to invoke the Hotels.com application. In various embodiments, application names may have any number of alternative names or synonyms that can be determined, by the server device, as corresponding to a particular application. For instance, a reference to "Google Drive" or "Drive" could correspond to the Google Drive application, or a reference to "Amazon" could correspond to the "Amazon Shopping" application, or vice versa, by way of example. It is contemplated that any variation of application names can be detected by the server device, and matched to a corresponding application name via the search engine. If a strong or direct reference to an application name is determined to be included in the received command representation, the server device can, at step 520*a*, generate a score (e.g., 0.1), which is maintained in a memory, and move forward with processing the command representation. In some further embodiments, the server device can extract or remove the detected prepositions and application name from the command representation. In this regard, a reduced command representation can include the remaining keywords or phrases without the determined strong mention of the detected application name (e.g., "show messages" or "book a hotel").

In some embodiments, the server device can determine that the command representation includes a reference to an application name, but that the application name is not assertively recited with a strong preposition (e.g., use, using, in, through). In this regard, the server device can determine that the command representation includes a weak mention of the application name. In this regard, and by way of example, "show WhatsApp messages" can indicate a weak mention of the WhatsApp application. In another example "book a Hotels.com hotel" can indicate a weak mention of the Hotels.com application. If a weak mention or a weak reference to an application name is determined to be included in the received command representation, the server device can, at step 520*b*, generate a second score (e.g., 0.001), which is maintained in a memory. In some further embodiments, the server device can extract or remove the detected application name from the command representation. In this regard, the reduced command representation can include the remaining keywords or phrases without the weak mention of the detected application name (e.g., "show messages" or "book a hotel").

In some embodiments, the server device can determine, at 520*c*, that the command representation does not include a reference to an application name. In this regard, and by way of example, "show messages" can indicate no mention of an application. In another example "book reservation" can also indicate a no mention of an application. If no application name is determined to be included in the received command representation, the server device can move forward with processing the command representation.

In some embodiments, the server device can, at step 530, identify one or more command templates stored by the server device that it determines corresponds to the reduced command representation or a command representation including no reference to an application name More specifically, the server device can generate a first query for communication to the search engine, employing either a reduced command representation or a command representation including no reference to an application name, to determine whether any of the stored command templates corresponds thereto. Based on the received search results, the server device can make a determination that at least one command template corresponds to the reduced command representation or command representation including no reference to an application name. In this regard, the server device can make a determination that the received command representation is suitable for conducting an additional search on the command templates stored by the server device. The server device can then select the determined corresponding command template(s), and generate, at step 540, one or more new search queries to send to the search engine, each new search query including at least one of the selected command templates and the received (e.g., non-reduced) command representation. If, however, a determination is made that no search results (e.g., action datasets or command templates associated therewith) corresponds to the reduced command representation, the server can make a determination that the received command representation is either too generic or not suitable for use for selecting a corresponding action dataset. In this regard, the server device can communicate to the digital assistant device that the received command representation is too vague, or inadequate to receive an action dataset in response to the received command or command representation.

In some embodiments, the server device can send the newly generated search query, including the received (e.g., non-reduced) command representation and the command templates determined to correspond to the reduced command representation, to the search engine to search the stored plurality of command templates, each stored command template being associated with at least one action dataset stored by the server device. The search engine can then generate, at step 550, one or more search results based on the newly generated search query. Each search result can include or reference an action dataset having one or more command templates that is determined, by the search engine, to correspond at least in part to the newly generated search query. In some further embodiments, the search engine can generate a preliminary score that is associated with or appended to each action dataset included in the search result. The preliminary score can be generated by the search engine based on a variety of factors, including confidence levels, level of accuracy, percentage of matching keywords or phrases, ordering of matching keywords or phrases, number of other corresponding action datasets, and the like. It is contemplated that the preliminary score can consider any number of factors generally known to one of ordinary skill in the art in determining a confidence score for search results generated by a search engine.

In some embodiments, the server device can evaluate each search result (e.g., action dataset and/or associated command template(s)) against a set of defined rules to generate, at step 560, a score for association with the search result. For instance, the server device may employ relevance component 350 of FIG. 3, to evaluate a search result (e.g., action dataset) against each rule in the set of defined rules. As is described herein with respect to component 350 of FIG. 3, the set of defined rules can be employed to determine whether the received command representation: contains a determined strong mention of an application or application name of a plurality of known applications or application names, matches or corresponds to a dictionary-based template, contains a determined weak mention of an application or application name of a plurality of known applications or application names, matches or corresponds to a plurality of command templates, does not exactly match or directly correspond to a command template but contains keywords or phrases that can be determined to match or correspond to parameters of a corresponding parameter database, contains keywords or phrases that cannot be determined to match or correspond to parameters of a corresponding parameter database, or determined to match or correspond to a wildcard command template, among other things, each described herein with respect to the defined rules of relevance component 350 of FIG. 3.

As described herein, each application dataset stored by the server device can include or be associated with various types of data, such as an application or application name, and one or more command templates with keywords, phrases, or parameter types, among other things. The server device can employ the relevance component to evaluate each search result (e.g., application dataset) returned from the search engine, and generate a score based on each rule in the defined set of rules that is determined to be satisfied for the search result (e.g., application dataset). As is described with respect to relevance component 350 of FIG. 3, a rule can be determined satisfied based on comparisons of conditions defined by the rule, against any combination of any portion of the application dataset, the data included or associated with the application dataset, and/or any portion of the received command representation. At step 570, after a search result application dataset is evaluated for relevance, the application dataset or a score associated with the action dataset can be modified by the server device. In other words, for each action dataset, each score generated based on a rule can be associated with the action dataset in a variety of manners. For instance, each score can be added to other scores generated for the action dataset to calculate a sum of scores appended to or associated with the action dataset. In another instance, each score can be assigned independent of one another, and appended to or associated with the action dataset.

In some embodiments, after each search result (e.g., action dataset) is evaluated against the defined set of rules and is, in some instances, modified based on whether any number of rules is determined satisfied, the search results (e.g., action datasets) can be re-ranked by the server device based on their modified scores. The server device can sort each search result based on their modified scores, and select one or more of the corresponding action datasets based on a defined threshold. A defined threshold can be defined to select only a highest-ranked action dataset, a predefined plurality of highest-ranked action datasets (e.g., the top 5 ranked), or a predefined percentage of highest-ranked action datasets (e.g., the top 5% ranked). In some further embodiments, the server device can determine that two or more search results are associated with the same rank or score. In this regard, the server can perform an additional search to determine which application dataset is more popular than the other application dataset. For instance, an application marketplace database can be searched to determine which application associated with the two or more search results has a higher download rate. In this way, the server can identify a more-likely candidate of the two or more action datasets determined to have the same rank or score.

In some embodiments, at step 580, the server device can select one or more of the determined highest ranked search results (e.g., action datasets) based on the defined threshold. At this juncture, the server device has employed its relevance determinations to identify the most probable action dataset to correspond to the command representation received from the digital assistant device. The server device can then communicate the selected one or more action datasets to the digital assistant device from which the command representation was received, as its response to the received command representation. In some aspects, if more than one action dataset is communicated to the digital assistant device, the digital assistant device can provide for display a prompt that requests a selection of the action dataset desired for invocation by the digital assistant device. The digital assistant device can then receive the selection and invoke the corresponding action dataset. In some instances, the digital assistant device can communicate the selection to the server device, and the server device can responsively communicate the corresponding action dataset to the digital assistant device for invocation thereon. In some other instances, the digital assistant device can receive each relevant action dataset, and invoke the action dataset based on the received selection.

Having described various embodiments of the invention, an exemplary computing environment suitable for implementing embodiments of the invention is now described. With reference to FIG. 7, an exemplary computing device is provided and referred to generally as computing device 700. The computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. Bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 presents data indications to a user or other device. Exemplary presentation components include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some embodiments of computing device 700 may include one or more radio(s) 724 (or similar wireless communication components). The radio 724 transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented method for providing relevant digital assistant operations to digital assistant devices based on received commands, the method comprising:

determining, by a server device, that at least one command template in a plurality of stored command templates corresponds to at least a portion of a command received from a digital assistant device, wherein the command includes an alphanumeric representation of a speech command received by the digital assistant device, and each command template of the plurality of stored command templates includes at least one keyword;

generating, by the server device, a search query that includes the received command and the at least one command template determined to correspond to at least the portion of the received command;

searching, by the server device, a plurality of stored action datasets based on the generated search query, wherein each action dataset in the plurality of stored action datasets is associated with at least one of the plurality of stored command templates and includes a set of instructions that is interpretable, by the digital assistant device, to emulate at least one touch input to an application installed on the digital assistant device and associated with the action dataset;

modifying, by the server device, a score of each action dataset included in a search result generated based on the searched plurality of stored action datasets, the score being modified based on an evaluation of the associated at least one command template against a defined set of rules;

communicating, to the digital assistant device, at least one action dataset in the generated search result that is determined to have a highest modified score, wherein the highest modified score indicates a highest determined relevance to the received command.

2. The computer-implemented method of claim 1, wherein at least the portion of the received command corresponds to the received command having at least an identified reference to an application removed therefrom.

3. The computer-implemented method of claim 2, wherein the determination that the at least one command template corresponds to at least the portion of the received command is based on a search performed on the plurality of stored command templates.

4. The computer-implemented method of claim 2, the method further comprising:

generating a preliminary score based on a determined strength of the identified application reference, wherein the preliminary score is employed to modify the score of the action dataset based on a determination that an application name associated with the application dataset corresponds to the identified reference to the application.

5. The computer-implemented method of claim 2, wherein the reference to the application is identified based on a searched plurality of known application names or a searched plurality of known synonymous identifiers of one of a plurality of known application names.

6. The computer-implemented method of claim 1, wherein a command template includes a first set of keywords and/or a first set of parameter fields, and wherein a corresponding command representation includes a second set of keywords determined to correspond the first set of keywords and/or or a third set of keywords determined to correspond to the first set of parameter fields.

7. The computer-implemented method of claim 6, wherein each parameter of the first set of parameter fields corresponds to one of a defined parameter field or a wildcard parameter field.

8. The computer-implemented method of claim 1, wherein each action dataset included in the generated search result includes the score that is initially associated with the action dataset by a search engine that generated the search result.

9. A non-transitory computer storage medium storing computer-useable instructions that, when used by one or more processors, cause the one or more processors to perform operations comprising:

determining that at least one command template in a plurality of stored command templates corresponds to at least a portion of a command received from a digital assistant device, wherein the command includes an alphanumeric representation of a speech command received by the digital assistant device, and each command template of the plurality of stored command templates includes at least one keyword;

searching a plurality of stored action datasets based on a generated search query that includes the received command and the at least one command template determined to correspond to at least the portion of the received command, wherein each action dataset in the plurality of stored action datasets is associated with at least one of the plurality of stored command templates and includes a set of instructions that is interpretable, by the digital assistant device, to emulate at least one touch input to an application installed on the digital assistant device and associated with the action dataset;

receiving a plurality of action datasets as a search result generated based on the search, each action dataset in the received plurality of action datasets having an associated score that defines a relative rank of the action dataset; and modifying the score of each action dataset included in the received plurality of action datasets based on a performed analysis of a command template associated with the action dataset, the received command, and a defined set of rules.

10. The computer-implemented method of claim 9, the instructions further causing the one or more processors to perform operations comprising:

communicating at least one action dataset included in the received plurality of action datasets and determined to have a highest modified score to the digital assistant device, wherein the highest modified score indicates a highest determined relevance to the received command.

11. The computer-implemented method of claim 9, wherein at least the portion of the received command corresponds to the received command having at least an identified reference to an application removed therefrom.

12. The computer-implemented method of claim 11, wherein the reference to the application is identified based on a searched plurality of known application names or a searched plurality of known synonymous identifiers of one of a plurality of known application names.

13. The computer-implemented method of claim 9, wherein the determination that the at least one command template corresponds to at least the portion of the received command is based on a search performed on the plurality of stored command templates.

14. The computer-implemented method of claim 9, the instructions further causing the one or more processors to perform operations comprising:

generating a preliminary score based on a determined strength of the identified application reference, wherein the preliminary score is employed to modify the score of the action dataset based on a determination that an application name associated with the application dataset corresponds to the identified reference to the application.

15. The computer-implemented method of claim 9, wherein a command template includes a first set of keywords and/or a first set of parameter fields, and wherein a corresponding command representation includes a second set of keywords determined to correspond the first set of keywords and/or or a third set of keywords determined to correspond to the first set of parameter fields.

16. The computer-implemented method of claim 9, wherein each action dataset included in the generated search result includes the score that is initially associated with the action dataset by a search engine that generated the search result.

17. A digital assistant server comprising:
at least one processor, and
at least one memory device storing computer-useable instructions that, when used by the at least one processor, cause the at least one processor to perform operations comprising:
determining that at least one command template in a plurality of stored command templates corresponds to at least a portion of a command received from a digital assistant device, wherein the command includes an alphanumeric representation of a speech command received by the digital assistant device, and each command template of the plurality of stored command templates includes at least one keyword;
generating a search query that includes the received command and the at least one command template determined to correspond to at least the portion of the received command;
searching a plurality of stored action datasets based on the generated search query, wherein each action dataset in the plurality of stored action datasets is associated with at least one of the plurality of stored command templates and includes a set of instructions that is interpretable, by the digital assistant device, to emulate at least one touch input to an application installed on the digital assistant device and associated with the action dataset;
modifying a score of each action dataset included in a search result generated based on the searched plurality of stored action datasets, the score being modified based on an evaluation of an associated command template against a defined set of rules;
communicating, to the digital assistant device, at least one action dataset in the generated search result that is determined to have a highest modified score, wherein the highest modified score indicates a highest determined relevance to the received command.

\* \* \* \* \*